(12) United States Patent
Boman et al.

(10) Patent No.: US 6,675,571 B2
(45) Date of Patent: Jan. 13, 2004

(54) APPARATUS FOR CONTROLLING THE HEAT TRANSFER TO THE NOZZLE WALL OF EXPANDER CYCLE ROCKET ENGINES

(75) Inventors: Arne Boman, Lidköping (SE); Jan Lundgren, Grundsund (SE); Mats Olofsson, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 43 days.

(21) Appl. No.: 09/980,481

(22) PCT Filed: Mar. 16, 2001

(86) PCT No.: PCT/SE01/00555

§ 371 (c)(1),
(2), (4) Date: Nov. 15, 2001

(87) PCT Pub. No.: WO01/69070

PCT Pub. Date: Sep. 20, 2001

(65) Prior Publication Data

US 2002/0134071 A1 Sep. 26, 2002

(30) Foreign Application Priority Data

Mar. 17, 2000 (SE) .................................................. 0000895

(51) Int. Cl.$^7$ .............................................. F02K 11/00
(52) U.S. Cl. ........................ 60/267; 60/770; 239/127.1; 239/127.3; 239/265.11
(58) Field of Search ................ 60/267, 770; 239/127.1, 239/127.3, 265.11

(56) References Cited

U.S. PATENT DOCUMENTS

| | | | |
|---|---|---|---|
| 3,712,546 A | | 1/1973 | Kaufmann .............. 239/265.11 |
| 4,799,543 A | * | 1/1989 | Iversen et al. ............... 165/135 |
| 4,879,874 A | * | 11/1989 | Koyari et al. .................. 60/259 |
| 5,267,437 A | * | 12/1993 | Foust ........................... 60/206 |
| 5,363,645 A | | 11/1994 | Pellet ........................... 60/267 |
| 5,410,874 A | * | 5/1995 | Limerick ....................... 60/267 |
| 5,832,719 A | * | 11/1998 | Riccardi ....................... 60/267 |

* cited by examiner

*Primary Examiner*—Justine Yu
*Assistant Examiner*—William H. Rodriquez
(74) *Attorney, Agent, or Firm*—Dickstein Shapiro Morin & Oshinksy, LLP

(57) ABSTRACT

The invention relates to an apparatus for increasing the heat transfer to the coolant at the inside of a nozzle wall provided with coolant channels of expander cycle rocket engines. To achieve this the invention proposes that, to disturb the boundary layer at the nozzle wall and thereby increasing the heat transfer, the inside of the nozzle wall facing the flame has a particularly chosen increased surface roughness of such a magnitude that it penetrates the viscous sub-layer of the boundary layer at the nozzle wall.

3 Claims, 2 Drawing Sheets

APPARATUS FOR CONTROLLING THE HEAT TRANSFER TO THE NOZZLE WALL OF EXPANDER CYCLE ROCKET ENGINES

FIELD OF THE INVENTION

The invention relates to an apparatus for increasing the power of expander cycle rocket engines, particularly to an apparatus for increasing the heat transfer to the coolant on the inside of a nozzle wall provided with coolant channels of expander cycle rocket engines.

BACKGROUND OF THE INVENTION

By, for instance, U.S. Pat. No. 3,712,546 it is known to control the boundary layer at the nozzle wall of the rocket engine. The object of this controlling of the boundary layer is to reduce the friction between the combustion gases and the nozzle wall so it is possible to increase the expansion ratio of rocket nozzles, particularly vacuum nozzles, and thereby the power of the rocket engine. The power increase of the rocket engine according to this document is thus achieved in another way than the apparatus according to the invention.

U.S. Pat. No. 5,363,645 describes an apparatus for transpiration cooling of the combustion gases in the throat of a rocket engine combustion chamber. However, the object of this invention is to optimise the consumption of coolant and not to increase the power of the rocket engine.

Usually, rocket engines are divided into different engine cycles depending on how the flow of the oxidant and the fuel are organised in the engines. In rocket engines of stage combustion cycle and gas generation cycle the combustion takes place in two places of the engine, i.e. in the main combustion chamber and in a secondary burner. The combustion gases from the secondary burner is used to drive the turbines of the fuel and oxidizer pumps.

However, in expander cycle rocket engines the combustion takes place only in the main combustion chamber, and the turbines for driving the fuel and oxidizer pumps are driven by the fuel (usually liquid hydrogen) flowing through the coolant channels in the walls of the main combustion chamber and the nozzle. Thus, this means that the fuel is fed from the tanks, through the pumps where the fuel pressure is increased, and through the coolant channels in the walls of nozzle and the combustion chamber and then to the turbines of the fuel and oxidizer pumps and then out into the combustion chamber in which it is burnt together with oxidizer. This means that the more the fuel is heated and expanded the more power can be gained from the fuel for driving the turbines, whereby the efficiency of the engine being increased.

The maximum reachable combustion chamber pressure is thus set by how much the fuel is heated in the coolant channels. Therefor, it is desirable to obtain as high combustion chamber pressure as possible, since this will give the largest power of the rocket engine.

To increase the pressure and thereby the power of an expander cycle rocket engine it is extremely important to maximize the heat transfer to the fuel for increasing its temperature. Even a small increase of the temperature of the fuel has great importance, since the power of the engine will thereby be increased.

Different experiments within the prior art for increasing the heat transfer to the fuel comprises i.a. increasing of the area of the nozzle wall facing the flame, for instance, by forming the nozzle wall of pipes with half circular or circular cross-section. Another way is to make the nozzle wall of a material with high heat conductivity such as copper.

The drawback of the known technique in the area of the invention is that nozzle walls formed of pipes with half-circular or circular cross-section has low strength in the direction of the tangent and must therefore be reinforced on the outside with different means. This means that the nozzle will be heavy and payload capacity is lost. To make a nozzle wall of copper has the drawback that copper is difficult to weld and has lower tensile strength than, for instance, steel and nickel based materials which means that a nozzle of copper will be heavier than a corresponding nozzle of steel.

BRIEF SUMMARY OF THE INVENTION

The object of the invention is to eliminate the above-mentioned drawbacks of the prior art.

This object is achieved according to the invention in that, to disturb the boundary layer at the nozzle wall and thereby increase the heat transfer, the inside of the nozzle wall facing the flame has a particularly chosen increased surface roughness of such a magnitude that it penetrates the viscous sub-layer of the boundary layer at the nozzle wall.

BRIEF DESCRIPTION OF THE DRAWING

A non-limiting example of the invention will now be described with reference to the accompanying drawings, in which.

DETAILED DESCRIPTION OF THE INVENTION

Figure 1:
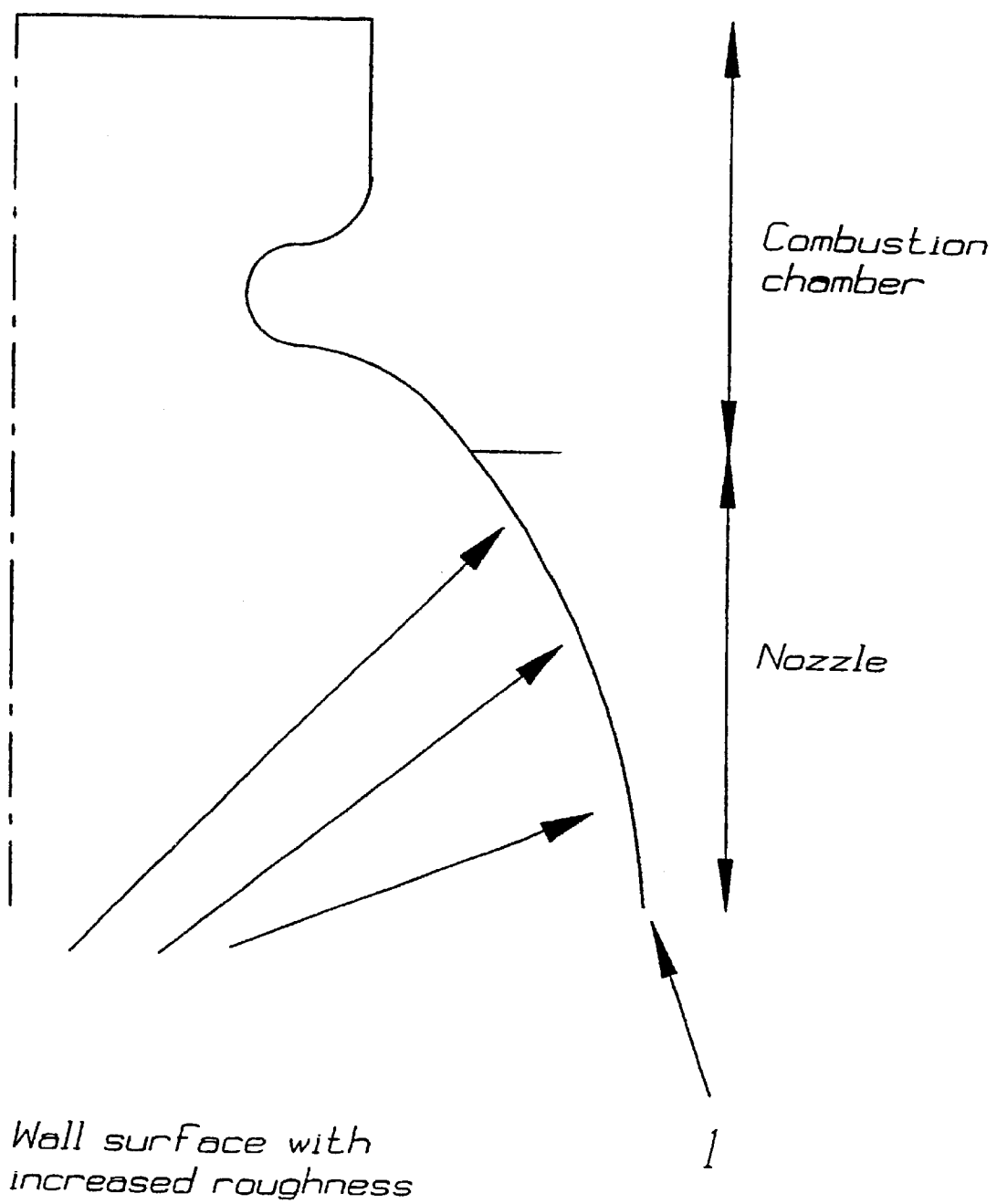
FIG. 1 is a cross-sectional view of one half of a rocket nozzle with an attached combustion chamber according to the invention.
Figure 2:
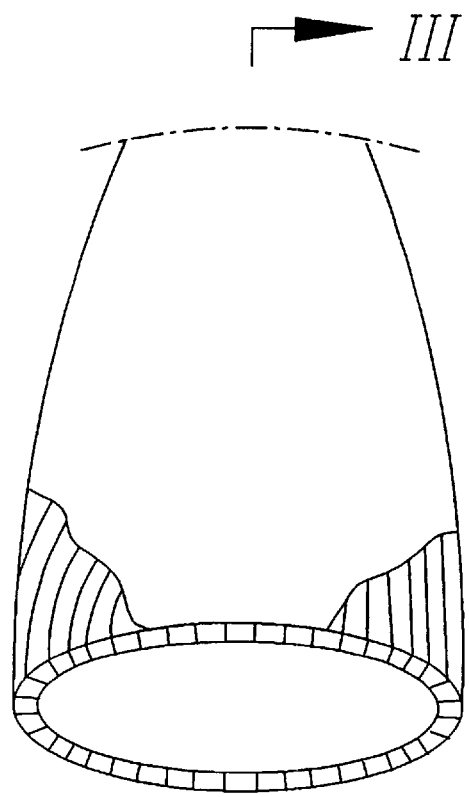
FIG. 2 is a side view, partially from below, of a nozzle according to the invention, in which, to the left, coolant channels are shown having a slight curvature around the nozzle are shown, and to the right, straight coolant channels are shown.
Figure 3:
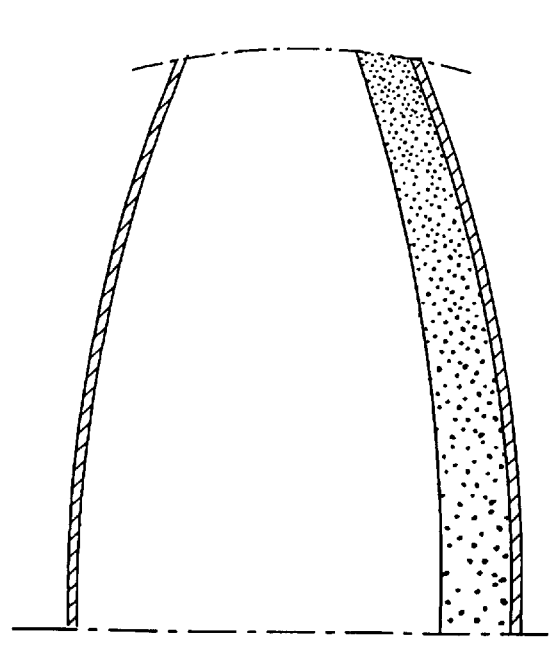
FIG. 3 is a sectional side view of a nozzle according to the invention, in which, to the right, the rough surface of the nozzle wall is shown as increasing progressively from the inlet to the outlet of the nozzle.

As can be seen from the drawing the inside of the nozzle wall 1 shows a particularly chosen increased surface roughness. This surface roughness must be so large that it penetrates the viscous sub-layer of the boundary layer.

A lower limit in which the surface roughness will have full effect on the heat transfer can be defined as follows:

$$y^+ = (c_f \ast U^2/2)^{0.5} y/v$$

where $c_f$ is skin friction, u is the velocity at the boundary layer, v is the viscosity and y is the distance normal to the nozzle wall.

The surface roughness should be at least 50 $y^+$ which is the lower limit within which the surface roughness without any doubt will penetrate the viscous sub-layer of the boundary layer.

For a typical nozzle of an expander cycle rocket engine the surface roughness should increase progressively from the inlet to the out-let of the nozzle. At the inlet the surface roughness should be about 0.15 mm and at the outlet about 1 mm.

This surface roughness on the inside of the nozzle can be achieved by, for instance, machining, such as grinding, milling or by depositing of material through flame or plasma spraying.

By increasing the surface roughness in this way it is possible to achieve an increase of the temperature of the coolant (fuel) of at least 10 K which produces an increase of the cooling effect of at least 1% or more of the rocket engine of the above-mentioned type.

What is claimed is:

1. A nozzle including an inlet, an outlet, an inner side, an outer side, a nozzle wall, and a boundary layer at the nozzle wall, said boundary layer having a viscous sublayer, said nozzle provided with coolant channels of expander cycle rocket engines, wherein the inner side of the nozzle wall facing the flame has a surface roughness of such a magnitude that penetrates the viscous sub-layer of the boundary layer at the nozzle wall so as to increase the heat transfer to the coolant by disturbing the boundary layer at the nozzle wall.

2. A nozzle according to claim 1, characterized in that the surface roughness increases progressively from the inlet to the outlet of the nozzle.

3. A nozzle according to claim 2, characterized in that the surface roughness varies from about 0.15 mm at the inlet of the nozzle to about 1 mm at the outlet of the nozzle.

* * * * *